United States Patent [19]
Boyer

[11] 3,985,831
[45] Oct. 12, 1976

[54] FLAME RETARDANT GRAFT POLYMER COMPOSITIONS PREPARED FROM PHOSPHINYL-SUBSTITUTED ACRYLONITRILES

[75] Inventor: Nicodemus E. Boyer, Parkersburg, W. Va.

[73] Assignee: Borg-Warner Corporation, Chicago, Ill.

[22] Filed: June 30, 1975

[21] Appl. No.: 591,374

[52] U.S. Cl. .................... 260/880 R; 260/45.95 R; 260/879
[51] Int. Cl.² .......................................... C08L 9/00
[58] Field of Search....... 260/80.71, 85.5 A, 88.7 A, 260/879, 880 R

[56] References Cited
UNITED STATES PATENTS

| | | |
|---|---|---|
| 2,920,097 | 1/1960 | Frazza............................ 260/85.5 A |
| 3,047,606 | 7/1962 | Wadsworth .................... 260/80.3 R |
| 3,488,744 | 1/1970 | Nemphos............................ 260/879 |
| 3,683,052 | 8/1972 | Coffey ................................ 260/879 |
| 3,691,127 | 9/1972 | Kraft.................................. 260/884 |
| 3,726,839 | 4/1973 | Jin ..................................... 260/884 |
| 3,846,509 | 11/1974 | Saluti................................. 260/879 |
| 3,891,722 | 6/1975 | Miloscia.......................... 260/880 R |

*Primary Examiner*—Paul R. Michl
*Attorney, Agent, or Firm*—Richard J. Schlott

[57] ABSTRACT

Flame retardant graft polymers are prepared by graft polymerizing a phosphinyl-substituted acrylonitrile and at least one other vinyl monomer copolymerizable therewith in the presence of a rubber substrate. Polymers containing greater than 0.6% by weight, preferably 0.8 to 12.0% by weight, phosphorus exhibit flame retardant characteristics, which may be further improved by compounding with bis-halophenoxyalkanes.

4 Claims, No Drawings

FLAME RETARDANT GRAFT POLYMER COMPOSITIONS PREPARED FROM PHOSPHINYL-SUBSTITUTED ACRYLONITRILES

BACKGROUND OF THE INVENTION

This invention relates to graft polymer thermoplastic compositions made flame retardant by the incorporation of a phosphorus-substituted acrylonitrile monomer in the polymer. More particularly, the invention relates to graft polymers with improved flame retardant characteristics having incorporated therein an alpha or beta dialkoxy or alkyl alkoxy phosphinyl-substituted acrylonitrile as one of the grafting monomers.

Flame retardant properties have been imparted to thermoplastics by a variety of techniques. The most common method of the prior art is the compounding with flame retardant additives such as halogen compounds and organophosphorus compounds, and a great number of such additives are presently available for this purpose. In order to achieve adequate flame retardant character, large amounts of these additives are employed, and frequently greater than 30% of the total thermoplastic composition will consist of flame retardant additives. It is usually necessary to also include in the composition a synergist such as antimony oxide, zinc borate or the like to achieve maximum flame retardant properties. These synergists are known to enhance the activity of fire retardants, and may permit some reduction in additive level particularly when used in combination with the halogen-containing additives.

The use of high levels of flame retardant additives in thermoplastics suffers several disadvantages. Many of the additives are subject to loss from the composition during processing and subsequent use because of volatilization, leaching and/or bleeding. Flame retardant additives, and particularly those which are brominated materials, are often expensive and use of large amounts substantially increases the cost of the final composition. Many of the synergists are potentially toxic as well as expensive and in short supply, and a reduction in the use of these componds would be desirable both from an economic and an environmental standpoint.

The development of a useful thermoplastic material exhibiting good flame retardant properties alone or when compounded with a minimal level of a flame retardant additive, and which does not require use of synergistic compounds to achieve a high degree of flame retardant character would clearly be a useful advance in the art.

SUMMARY OF THE INVENTION

It has now been found that graft polymers can be made flame retardant by the incorporation of phosphorus-substituted acrylonitrile monomers in the grafting phase. More particularly, graft polymers of the ABS-type, wherein such monomers as acrylonitrile and styrene are graft polymerized in the presence of a rubber phase, exhibit fair to good flame retardant properties when a dialkoxy or alkyl alkoxy phosphinyl-substituted acrylonitrile monomer is included with the grafting monomers. Of particular importance is the surprising discovery that the phosphorus-containing graft polymers of this invention are made highly flame retardant by compounding with moderate amounts of halogen-containing secondary flame retardants without the need for including one of the common flame-retardant synergist compounds.

DETAILED DESCRIPTION

The graft polymers of the instant invention are prepared by graft polymerization of an acrylonitrile having a phosphinyl substituent at the alpha or beta position and at least one other copolymerizable vinyl monomer in the presence of a rubber substrate, employing one of the conventional graft polymerization processes.

The phosphinyl-substituted acrylonitrile monomers are conviently represented by the following formula:

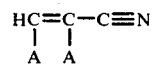

wherein one A is a phosphinyl group of the formula:

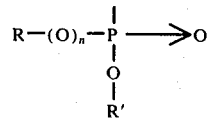

wherein R and R′ are independently selected from the group 1 to 4 carbon atom alkyl, halo-substituted 1 to 4 carbon atom alkyl, and 2 to 4 carbon atom alkenyl, and $n$ is 0 or 1, and the remaining A is selected from the group —H, 1 to 4 carbon atom alkyl, and halo-substituted 1 to 4 carbon atom alkyl.

Compounds within the scope are thus seen to be the alpha and beta isomers of (dialkoxyphosphinyl)acrylonitriles and [alkyl(alkoxy)phosphinyl]acrylonitriles, as well as analogs having vinyl unsaturation within or halogen substituents on the alkyl groups thereof.

The additional copolymerizing vinyl monomer may be any vinyl monomer copolymerizable therewith, including styrene, alkylstyrene, acrylonitrile, alkyl- or halogen-substituted acrylonitrile, and the acrylic acids and alkylacrylic acids and their esters.

The rubber component employed as a grafting substrate may be any of the rubber substrates conventionally employed in the preparation of ABS-type graft polymers, including polybutadiene, polyisoprene, polychloroprene and rubbery copolymers with vinyl monomers, such as styrene-butadiene rubber, nitrile rubber, acrylic rubber and the like.

The graft polymers of this invention may be prepared in any of the conventional suspension or emulsion processes such as the emulsion process disclosed in U.S. Pat. No. 3,238,275.

The amount of phosphinyl-substituted acrylonitrile monomer to be employed may be varied over a wide range; however, the flame retardant properties of the final composition will be dependent upon the amount of phosphorus incorporated, and the amount of phosphorus in the final composition will be greater than about 0.6% by weight. The amount of rubber substrate employed will be between 10 and about 45% by weight, and the remainder of the total composition will consist of at least one copolymerizable vinyl monomer as described above. The preferred ranges will be an amount of phosphinyl-substituted acrylonitrile monomer sufficient to provide between 0.6 and 12.0% by weight phosphorus in the final composition.

The graft polymers of the instant invention exhibit flame retardant characteristics. however, the flame retardant properties can be further improved by addition of secondary flame retardants, and particularly those described as halogenated phenoxyalkanes. Compounds of this type are disclosed, for example, in U.S. Pat. No. 3,824,209 as being flame retardants for a variety of polymeric compositions, particularly when a synergistic additive such as zinc borate or antimony oxide is included. The flame retardant polymers of this invention when compounded with halogenated phenoxy-alkanes, exhibit excellent flame retardant properties without the including of synergists.

The invention will be more clearly described by means of the examples set forth hereinbelow. It will be understood that the following examples ae provided by way of illustration and are not intended to restrict the invention to specific named compounds and compositions. The elemental analyses were carried out by standard analytical methods, and oxygen was determined by difference. The molecular weights given were determined by the ebullioscopic method in the solvent indicated. Where parts are used, all parts are by weight.

A. Preparation of Phosphinyl-substituted Acrylonitrile Monomers

EXAMPLE 1

Alpha-(Dimethoxyphosphinyl)acrylonitrile or dimethyl 1-cyano-vinylphosphonate, hereinafter referred to as α-DMPAN, was prepared as a colorless liquid by the method described by William S. Wadsworth, Jr., U.S. Pat. No. 3,047,606 in 79% yield.

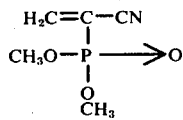

alpha-(Dimethoxyphosphinyl)acrylonitrile (α-DMPAN)

EXAMPLE 2

A solution of 0.15 mole (30.0 g.) of triallyl phosphite in 50 ml. of allyl alcohol was added to solution of 0.16 mole (14.0 g.) of alpha-chloroacrylonitrile in 50 ml. of allyl alcohol over a period of 1.5 hours and at 21°–36° C. After addition was complete, the reaction mixture was heated to 60°–68° C. for 3 hours. Allyl alcohol was distilled off at 45°–60° C./94–102 mm, followed by distillation of the product β-DAPAN.

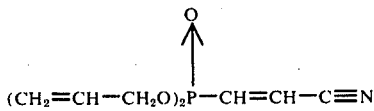

beta-(Diallyloxyphosphinyl)acrylonitrile (β-DAPAN)
The product was analyzed as follows:

| | %C | %H | %N | %P | %O | Molecular weight |
|---|---|---|---|---|---|---|
| Calcd. for C$_9$H$_{12}$NPO$_3$: | 50.70 | 5.68 | 6.57 | 14.54 | 22.51 | 213.2 |
| Found: | 50.72 | 5.70 | 6.53 | 14.37 | 22.68 | 220 (Acetone) |

β-DAPAN is a clear, colorless liquid, b.p. 109° C./0.24 mm to 119° C./0.2 mm.

EXAMPLE 3

The method of Example 2 was employed except that tris(methallyl) phosphite was substituted in an equimolar amount for triallyl phosphite and methallyl alcohol was substituted for allyl alcohol. The product was a clear, colorless, liquid, b.p. 115° C./0.15 mm to 130° C./0.12 mm. It was identified as β-DMAPAN by the following analyses:

| | %N | %P | Molecular Weight |
|---|---|---|---|
| Calcd. for C$_{11}$H$_{16}$O$_3$NP: | 5.81 | 12.84 | 241.2 |
| Found: | 5.83 | 12.79 | 245 (Acetone) |

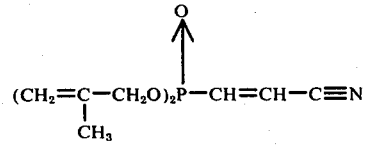

beta-(Dimethallyloxyphosphinyl)acrylonitrile (β-DMAPAN)

EXAMPLE 4

Three moles (808.5 g.) of tris(2-chloroethyl) phosphite were added to a solution of 3 moles (262.5 g.) of alpha-chloroacrylonitrile in 700 ml. of 2-chloroethanol at 38°–50° C. The reaction mixture was heated at 50°–67° C. for 2.75 hours. The product, beta-[bis(2-chloroethoxy)phosphinyl]acrylonitrile (β-DCEPAN), was recovered by stripping the solvent under water pump vacuum, and then distilling the residual liquid under oil pump vacuum.

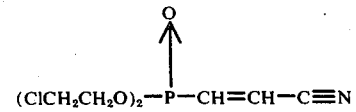

beta-[bis(2-chloroethoxy)phosphinyl]acrylonitrile (β-DCEPAN) β-DCEPAN is a clear, colorless liquid, b.p. 166° C./0.22 mm to 167° C./0.27 mm. The product analyses were as follows:

| | %C | %H | %Cl | %P | %N | %O |
|---|---|---|---|---|---|---|
| Calcd. for $C_7H_{10}Cl_2PNO_3$: | 32.58 | 3.91 | 27.48 | 12.00 | 5.43 | 18.60 |
| Found: | 32.03 | 4.12 | 28.24 | 11.51 | 4.95 | 19.15 |

EXAMPLE 5

A clear, colorless solution of 262.5 g. (3 moles) of alpha-chloroacrylonitrile in 700 ml. of dry methanol was preheated to 33° C. in a dry nitrogen atmosphere. To this solution was added dropwise, in 3 hours at 33°–55° C., 372.2 g. (3 moles) of trimethyl phosphite. The reaction was exothermic, so that during most of the time of addition external heating was not necessary. After the addition, the clear, very pale yellowish solution was heated for 1.7 hours at 51°–70° C. The mixture was allowed to stand at room temperature overnight.

Methanol was removed by distillation at a reduced pressure in a flash evaporator, and the product, beta-(dimethoxyphosphinyl)acrylonitrile ($\beta$-DMPAN) was distilled at 90° C./0.9 mm to 133° C./0.7 mm. The yield of $\beta$-DMPAN, a clear, colorless liquid, was 468.4 g. or 96.9%. It was redistilled at 123° C./1.76 mm to 122° C./1.3 mm and analyzed as follows:

| | %C | %H | Molecular Weight |
|---|---|---|---|
| Calcd. for $C_5H_8O_3PN$: | 37.28 | 5.01 | 161.1 |
| Found: | 37.22 | 5.04 | 163 (Chloroform) |

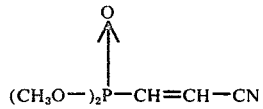

beta-[Dimethoxyphosphinyl]acrylonitrile ($\beta$-DMPAN)

EXAMPLE 6

In a 250 ml. round-bottom three-necked flask were placed 75.9 g. (0.457 mole) of triethyl phosphite and 40 g. (0.457 mole) of cis-betachloroacrylonitrile in dry nitrogen atmosphere. The flask was fitted with a mechanical stirrer, a thermometer, a nitrogen inlet tube, and a Dean-Stark distillation receiver with a dry ice condenser on the vapor trap. The reaction mixture was heated for 4 hours at 120° C., while ethyl chloride was collected in the dry ice trap. The product, beta-(diethoxyphosphinyl)-acrylonitrile ($\beta$-DEPAN) was distilled at 140°–175° C. of pot temperature and 100°–109° C. vapor temperature at 0.3 to 1.6 mm pressure. The yield of $\beta$-DEPAN was 48.2 g. (55.7%). When redistilled $\beta$-DEPAN had a b.p. 106° C./0.5 mm. It was a colorless liquid. Its composition was confirmed by elemental, infrared, and n.m.r. analyses.

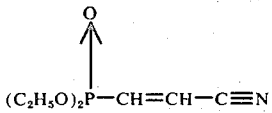

beta-[Diethoxyphosphinyl]acrylonitrile ($\beta$-DEPAN)

| | %C | %H | %P |
|---|---|---|---|
| Calcd. for $C_7H_{12}O_3PN$: | 44.45 | 6.40 | 16.37 |
| Found: | 44.20 | 6.74 | 16.27 |

EXAMPLE 7

A solution of 0.3 mole (33.7 g.) of potassium tert.-butoxide in 200 ml. of acetone was added dropwise to a solution of 0.15 mole (38.8 g.) of $\beta$-DCEPAN (Example 4) in 100 ml. of acetone at 20°–35° C. over a period of 10 minutes, with external cooling. By-product potassium chloride was filtered off, the filtrate was acidified to pH 6 by adding 0.5 ml. of glacial acetic acid, 0.3 g. of 4-t-butylpyrocatechol was added and distillation at reduced pressure was employed to obtain the product ($\beta$-DVPAN), a clear, colorless liquid, b.p. 62°–72° C./0.01 mm. It was identified by analyses as follows:

| | %P | %N |
|---|---|---|
| Calcd. for $C_7H_8O_3PN$: | 16.73 | 7.57 |
| Found: | 16.92 | 7.61 |

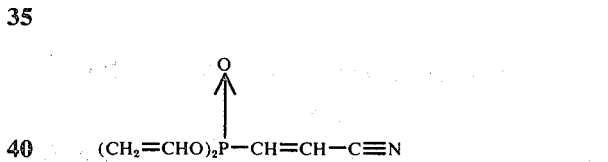

beta-[bis(Vinyloxy)phosphinyl]acrylonitrile ($\beta$-DVPAN)

This product was also prepared from 0.3 mole $\beta$-DCEPAN (Example 4) by dehydrochlorination, using 0.6 mole of 1,1,3,3-tetramethylguanidine in xylene solution.

EXAMPLE 8

To 9.54 moles or 720 g. of chloroacetonitrile (a yellow liquid, b.p. 123°–124° C., density 1.193 at 20° C.), pre-heated to 98° C., were added dropwise, with mechanical stirring, in nitrogen atmosphere, 2028.7 g. of technical grade triethyl phosphite. The addition was completed at 100° to 148° C. in 11 hours and 35 minutes, followed by heating for 1 hour and 40 minutes at 150° C. If pure triethyl phosphite is used, the equivalent amount (1585.0 g.) can be successfully employed instead of the excess indicated above. During the addition period the by-product ethyl chloride was distilled at atmospheric pressure. The excess triethyl phosphite and its self-rearrangement product, diethyl ethylphosphonate, were removed by distillation over a period of about 2 hours at a pot temperature of 115° C. to 150° C. and the vapor temperature and pressure 36° C./63 mm to 122° C./13 mm. The residual liquid was then distilled at reduced pressure to give 1001.6 g. of a nearly colorless, clear liquid, density $D_{20}^{24} = 1.117$;

index of refraction $n_D^{25} = 1.4315$, identified by elemental analyses and I.R. spectra as analytically pure diethyl cyanomethylphosphonate (DECMP).

The DECMP was converted to alpha-(diethoxyphosphinyl)-acrylonitrile or α-DEPAN as follows:

Paraformaldehyde (32.0 g.), 2.0 g. of piperidine and 8.0 g. of glacial acetic acid were refluxed in absolute methanol. The initially cloudy reaction mixture was refluxed at 65°–68.5° C. for 6 hours until it became an almost clear, colorless liquid, then cooled to 40° C. and 142.4 g. (0.803 mole) of diethyl cyanomethylphosphonate (DECMP) were added. The reaction mixture was refluxed for 5 hours at 68°–69.5° C. Methanol was then distilled off up to 65° C. of pot temperature and 35° C./48 mm vapor temperature.

To the residual solution was added 350 ml. of benzene, and water was removed by azeotropic distillation. After 1.8 ml. of water had been collected, 5.5 g. of 85.5% orthophosphoric acid was added and the distillation was continued until the total of 10.4 ml. of water was collected. The rest of benzene was distilled in a flash evaporator at up to 80° C. and at a reduced pressure, and the α-DEPAN was distilled at a pot temperature of 75° C. and a vapor temperature and pressure of 69°–78° C./0.08 mm., in 89.5% yield. It was correctly identified as α-DEPAN by elemental analyses and the I.R. spectrum.

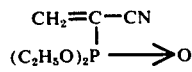

alpha-[Diethoxyphosphinyl]acrylonitrile (α-DEPAN)

EXAMPLE 9

To a mixture of 23.8 parts by weight of methanol, 81.0 parts of triethylamine, and 300.0 parts of diethyl ether, pre-cooled in a nitrogen atmosphere at −15° C., were added dropwise, with stirring, in 1 hour, 49.0 parts of ethyldichlorophosphine ($C_2H_5PCl_2$) while the temperature was kept below −5° C. by external cooling. The mixture was stirred for an additional period of 2 hours while it was allowed to warm up to room temperature. Triethylamine hydrochloride was removed by filtration, and the filtrate was distilled at 36°–90° C./210 mm Hg. After a repeated fractional distillation at 73°–75° C./225 mm, pure dimethyl ethylphosphonite or $C_2H_5P(-OCH_3)_2$ was obtained as a colorless liquid in 44% yield. It was identified by its boiling range and the infrared spectrum.

Alpha-chloroacrylonitrile, 8.75 parts, was dissolved in 30 parts methanol. To this solution was added dropwise, in nitrogen atmosphere, at 30°–50° C., in 1 hour 12.21 parts of dimethyl ethylphosphonite, allowing methyl chloride to evaporate. The mixture was then heated for 2 hours at 50°–60° C., and then methanol was distilled off. The residue, a nearly colorless liquid, was identified as β-[ethyl(methoxy)phosphinyl]acrylonitrile (ME-2CVP) by means of elemental analyses and the infrared and n.m.r. spectra, the yield was nearly quantitative. The Me-2CVP can be distilled, preferably at very low pressures.

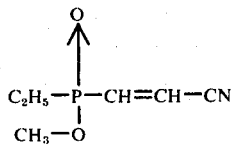

β-[ethyl(methoxy)phosphinyl]acrylonitrile (ME-2CVP)

EXAMPLE 10

Equimolar amounts of dimethyl ethylphosphonite (intermediate of Example 9) and chloroacetonitrile were reacted by the procedure described in Example 8 for synthesizing DECMP, but using dimethyl ethylphosphonite in place of triethyl phosphite, and no excess of the phosphorus compound was employed. The main product obtained by distillation at a reduced pressure was identified by elemental analyses, infrated and n.m.r. spectra as methyl ethyl(cyanomethyl)phosphinate, (MEC-MP). The intermediate was reacted with paraformaldehyde, piperidine, and glacial acetic acid in absolute methanol, the solvent was distilled, and the residue was subsequently heated with a small amount of phosphoric acid in benzene solution employing the same conditions as described in Example 8, but substituting an equimolar amount of MEC-MP for DECMP, and using half the heating time in benzene. The product was alpha-[ethyl(methoxy)phosphinyl]acrylonitrile (ME-1CVP), obtained as a yellowish liquid after distillation of the other reactants at a reduced pressure. To avoid spontaneous polymerization, the heating time should be minimized.

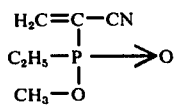

alpha-[ethyl(methoxy)phosphinyl]acrylonitrile (ME-1CVP)

Other phosphorus-substituted acrylonitrile monomers can be prepared employing the processes of Examples 1–10. Illustrative of monomers which are useful for the purposes of this invention include: (dipropoxyphosphinyl)acrylonitrile, (dibutoxyphosphinyl)acrylonitrile, [butoxy(methoxy)phosphinyl]-acrylonitrile, (dimethoxyphosphinyl)methacrylonitrile, (diethoxy-phosphinyl)chloropropylacrylonitrile, [bromoethoxy(bromomethoxy)-phosphinyl]acrylonitrile, [bis(-fluoromethoxy)phosphinyl]acrylonitrile, (diallyloxphosphinyl)methacrylonitrile, [ethyl(ethoxy)phosphinyl]-acrylonitrile, [butyl(butoxy)phosphinyl]acrylonitrile and the like, as the alpha and beat isomers and as mixtures thereof.

B. Preparation of the Graft Polymer

EXAMPLE 11

A graft polymer of styrene, acrylonitrile and the α-DEPAN of Example 8 was prepared in the following manner:

To a 1-liter, three-necked flask fitted with stirrer, reflux condenser, nitrogen inlet, dropping funnel, and the thermometer was added 50.45 g. (20.0 g., dry weight) of cross-linked, aqueous, acid-stable polybutadiene latex, 2.0 g. of 40% aqueous p-laurylbenzenesulfonic acid and 160 g. of demineralized water. The mixture was heated with stirring to 60° C., and a freshly prepared solution containing 0.100 g. of sodium formaldehyde sulfoxylate (SFS), 0.024 g. of ethylenediaminetetraacetic acid disodium salt (EDTA-Na$_2$), and 0.006 g. of ferrous sulfate heptahydrate (FeSO$_4$·7H$_2$O) in 15 ml. of water was added with stirring. A solution containing 42.0 g. of styrene, 18.0 g. of acrylonitrile, 20.0 g. of alpha-(diethoxyphosphinyl)acrylonitrile (α-DEPAN), Example 8, 0.20 g. of cumene hydroperoxide (70%), and 0.05 g. of tertiary dodecylmercaptan was added dropwise with stirring over a 25 minute period, and the mixture was then stirred at 60° C. for 4 hours. The emulsion was stabilized with 2,2'-methylene-bis-(4-ethyl-6-tert.-butylphenol), then coagulated at 85° C. in 2 liters of demineralized water containing 3.0 g. of calcium chloride dihydrate (CaCl$_2$·2H$_2$O). A white polymer precipitated at once and was separated by filtration through a large Buchner funnel. The product after being washed and dried, amounted to 85.2 g. or 85.2% yield.

EXAMPLES 12–24

Additional phosphorus-containing graft polymers were prepared from the phosphinyl-substituted acrylonitrile monomers disclosed in Examples 1–10, above. These preparations, shown in Table I, were carried out substantially by the polymerization process of Example 11. Example 24 is a control polymer containing only styrene and acrylonitrile grafted onto polybutadiene, prepared by the same process.

The polymers of Examples 11–24 were tested for flame resistant character by first milling the dried polymers at 320° F., then compression molding the product polymers into test bars. The test bars were subjected to one or both of the following flame test procedures:

"Vertical Flame test"—This test was carried out according to the procedure described in Underwriters Laboratories (U.L.) Test No. 94. This is the most severe flame test used.

"Horizontal Flame Test"—This test employs the procedure of U.L. Test No. 94; however, the test bar is held in a horizontal position. This test is less severe, and is used to screen samples which are only moderately flame resistant.

The flame test results for Examples 11–24 are reported in Table I.

TABLE I.

| | | | Graft Polymers from Phosphinyl-Substituted Acrylonitriles | | | | | | |
|---|---|---|---|---|---|---|---|---|---|
| Example No. | Phosphinyl Monomer | Parts By Wt.[4] | Other Monomers[1] | Parts By Wt.[4] | Rubber[1] Phase | Parts By Wt.[4] | Total P[2] (Wt. %) | Flame Test Type | Results[1] |
| 11 | α-DEPAN (Ex. 8) | 20 | Sty. VCN | 42 18 | PBde | 20 | 3.36 | Horizontal | SE |
| 12 | α-DMPAN (Ex. 1) | 35.7 | Sty. VCN | 25.8 8.8 | PBde | 29.7 | 6.85 | Vertical | SE, Group I |
| 13 | β-DAPAN (Ex. 2) | 35.7 | Sty. VCN | 25.8 8.8 | PBde | 29.7 | 5.17 | Horizontal | SE |
| 14 | β-DMAPAN (Ex. 3) | 35.7 | Sty. VCN | 25.8 8.8 | PBde | 29.7 | 4.57 | Horizontal | SE |
| 15 | β-DCEPAN (Ex. 4) | 35.7 | Sty. VCN | 25.8 8.8 | PBde | 29.7 | 4.28 | Horizontal | SE |
| 16 | β-DMPAN (Ex. 5) | 59.6 | Sty. VCN | 17.4 3.0 | PBde | 20 | 11.44 | Horizontal | SE |
| 17 | α-DEPAN (Ex. 8) | 20 | Sty. VCN | 42 18 | Bde VCN Sty. AcrA | 13.5[3] 1.8 4.2 0.5 | 3.36 | Horizontal | SE |
| 18 | α-DEPAN (Ex. 8) | 18.7 | Sty. MAN MMA | 39.2 4.7 18.7 | PBde | 18.7 | 3.07 | Horizontal | SE |
| 19 | α-DEPAN (Ex. 8) | 18.2 | Sty. VCN EtAcr | 38.2 16.3 9.1 | PBde | 18.2 | 2.98 | Horizontal | SE |
| 20 | α-DEPAN (Ex. 8) | 20 | Sty. VCN | 42 18 | Isopr. Sty. | 18[3] 2 | 3.36 | Horizontal | SE |
| 21 | α-DEPAN (Ex. 8) | 19 | AMS VCN | 44.8 17.2 | Chloropr. | 19 | 3.12 | Vertical | Se, Group I |
| 22 | β-DEPAN (Ex. 6) | 29.4 | Sty. VCN | 48.5 8.2 | PBde | 13.9 | 4.82 | Horizontal | SE |
| 23 | ME-2CVP (Ex. 9) | 20 | Sty. VCN | 42 18 | PBde | 20 | 3.90 | Horizontal | SE |
| 24 | (Control) | — | Sty. VCN | 52.5 22.5 | PBde | 25 | 0 | Horizontal | Burns, NSE |

Notes:
[1]Sty. = Styrene; VCN = Acrylonitrile; MAN = Methacrylonitrile; MMA = Methyl methacrylate; EtAcr = Ethyl acrylate; AMS = α-methylstyrene; PBde = Polybutadiene; AcrA = Acrylic acid; Isopr. = Isoprene; Chloropr. = Polychloroprene; SE = Self-extinguishing; NSE = Not self-extinguishing; SE Group I = Self-extinguishing, Group I, no dripping upon ignition (U.L. Test).
[2]Theoretical Weight % P in total polymer composition.
[3]Rubber latex from monomers shown.
[4]Parts by weight based on total polymer solids (theory).

The graft polymers of this invention are thus seen to be flame retardant materials, as in Examples 11–23 whereas a typical acrylonitrile-styrene graft copolymer on butadiene, Example 24, burns and is not self-extinguishing.

As was said, plastic materials are commonly compounded with flame retardant additives including halogen-containing additives, together with a synergistic compound such as antimony oxide to provide compositions having self-extinguishing characteristics. The graft polymers of this invention are also capable of being compounded with flame-retardant additives to provide enhanced flame resistance. The surprising feature of the graft polymers of this invention is the discovery that excellent flame resistance can be achieved without the use of synergistic compounds at relatively low levels of halogen-containing additives.

C. Compounding of the Graft Polymers

EXAMPLES 25–30

In Examples 25 and 28, the phosphorus-containing graft polymers of this invention are compounded with flame retardant additives of the halogenated phenoxy-alkane type. Halogenated phenoxyalkane flame retardants are disclosed for example in U.S. Pat. No. 3,824,209, and are represented by the formula:

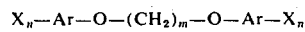

$$X_n-Ar-O-(CH_2)_m-O-Ar-X_n$$

where X is a halogen, $n$ is 1 to 7, $m$ is 1 to 6 and Ar is substituted phenylene or naphthylene.

Representative compounds are bis-(2,4,6-tribromophenoxy)methane (TPM), bis-(pentabromophenoxy)methane, bis-(dibromo-β-naphthyloxy)methane, (2,4,6-tribromophenoxy)pentabromophenoxymethane, bis-(4-fluorophenoxy)methane, bis-(4-chlorophenoxy)methane, bis-(4-iodophenoxy)methane, bis-(2,4-dichlorophenoxy)methane, 1,2-bis-(pentabromophenoxy)ethane (BPPE), 1,3-bis(pentabromophenoxy)-propane (BPPP), α,β-bis(2,4,6-tribromophenoxy)ethane (BTPE), and α,γ-bis-(2,4,6-tribromophenoxy)-propane. Some of these and related bis(haloaryloxy)alkanes are described in the art and general methods for their preparations from salts of the corresponding phenols and naphthols are known. The compositions of Examples 25–30 include a moderate amount of a chlorinated polyethylene, obtained from Dow Chemical Company as CPE-04, containing 48% by weight chlorine. The blends were prepared by mixing the materials in approximately the proportions given in Table II, together with 1 part by weight magnesium stearate, milling the mixture at 320° F. for 5 minutes, then compression molding the blend to form test bars.

The test bars were subjected to the Vertical Flame Test described above; the results are reported in Table II.

tests when compounded with moderate amounts of a brominated phenoxy-alkane together with a chlorinated polyethylene (Examples 25 and 28). Control examples, prepared by blending the ABS-type graft polymer containing styrene and acrylonitrile grafted onto a polybutadiene substrate of Example 24 with the same levels of brominated phenoxyalkanes and chlorinated polyethylene are given as Examples 26 and 29 and it will be seen that graft polymers having no phosphinyl-substituted acrylonitrile monomer present are not rendered self-extinguishing at these additive levels in the same severe test method.

As was said, conventional polymers are normally blended with a combination of a flame retardant additive and a synergist. Control Examples 27 and 30 were prepared as before by blending the ABS-type polymer of Example 24 with the same levels of brominated phenoxyalkane and chlorinated polyethylene as before but with the addition of synergists antimony oxide (Example 27) and further with zinc borate (Example 30) and submitted to the flame test. It will be seen that where the flame resistant graft polymers of the instant invention provide compositions which are self-extinguishing in the most severe test without the use of synergists, the flammable conventional ABS-type material is made self-extinguishing in the severe vertical test only by means of adding synergists along with the flame retarding additives.

Thus, the instant invention is described as graft polymers which are flame retardant by virtue of the inclusion of phosphinyl-substituted acrylonitrile monomers in the grafting phase. The graft polymers of the instant invention are rendered self-extinguishing to the severe U.L. Vertical Flame Test procedure by including moderate amounts of additives such as halogenated phenoxyalkanes, surprisingly not requiring the inclusion of synergists such as antimony oxide or zinc borate for this purpose. These compositions may of course be further compounded with fillers, stabilizers, lubricants and processing aids as well known in the art.

Other modifications of the instant invention will be apparent to one skilled in the art, and the invention is not intended to be limited by the illustrative examples to the specific compounds or processes employed therein. The invention is therefore defined solely by the

TABLE II.

Phosphorus-Containing Graft Polymers Compounded with Brominated Phenoxyalkanes

| Example No. | Polymer Ex. No. | Parts by Weight | Additive | Parts by Weight | Flame Test Results |
|---|---|---|---|---|---|
| 25 | 11 | 100 | CPE | 5 | SE V-0 |
| | | | BPPE | 20 | |
| 26 | 24 Control | 100 | CPE | 5 | Burns NSE |
| | | | BPPE | 20 | |
| 27 | 24 Control | 100 | CPE | 5 | SE V-0 |
| | | | BPPE | 20 | |
| | | | Sb$_2$O$_3$ | 7.5 | |
| 28 | 11 | 100 | CPE | 5 | SE V-0 |
| | | | BPPP | 20 | |
| 29 | 24 Control | 100 | CPE | 5 | Burns NSE |
| | | | BPPP | 20 | |
| 30 | 24 Control | 100 | CPE | 5 | SE V-0 |
| | | | BPPP | 20 | |
| | | | Sb$_2$O$_3$ | 7.5 | |
| | | | ZnBorate | 5 | |

Notes:
1. CPE = chlorinated polyethylene; BPPE = 1,2-bis-(pentabromophenoxy)ethane; BPPP = 1,3-bis-(pentabromophenoxy)-propane; Sb$_2$O$_3$ = antimony oxide (synergist); ZnBorate = zinc borate (synergist).
2. Flame Test = "Vertical Test", U.L. Test No. 94. SE = self-extinguishing; V-0 = group 0 of U.L. Test; NSE = non-self-extinguishing.

It will be apparent from the flame test data given in Table II that the graft polymers of this invention, containing phosphinyl-substituted acrylonitriles, exhibit excellent flame retardant properties in the most severe

I claim:

1. A flame retardant composition comprising a graft copolymer prepared by copolymerizing a phosphinyl-substituted acrylonitrile monomer of the formula:

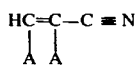

wherein one A is a phosphinyl group of the formula:

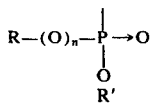

wherein R and R' are independently selected from the group 1 to 4 carbon atom alkyl, halo-substituted 1 to 4 carbon atom alkyl, and 2 to 4 carbon atom alkenyl, and $n$ is 0 or 1, and the remaining A is selected from the group —H, 1 to 4 carbon atom alkyl, and halo-substituted 1 to 4 carbon atom alkyl, with at least one vinyl monomer copolymerizable therewith, in the presence of from 10% to about 45% by weight based on the total composition of a rubbery polymer of a 4 to 6 carbon atom conjugated diene and a bis-(haloaryloxy)alkane of the formula:

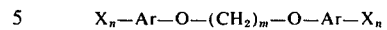

wherein X is a halogen selected from the group chlorine, fluorine, bromine and iodine, Ar is substituted phenylene or naphthylene, $m$ is 1 to 6 and $n$ is 1 to 7.

2. The composition of claim 1 wherein the vinyl monomer is selected from the group styrene, alkylstyrene, halostyrene, acrylonitrile, alkylacrylonitrile, haloacrylonitrile, acrylic acid, alkylacrylic acid, and alkyl esters of acrylic acid and alkylacrylic acid, and the rubbery polymer is selected from the group polybutadiene, polyisoprene, polychloroprene, styrene-butadiene rubber, nitrile rubber, and acrylic rubber.

3. The composition of claim 1 wherein said phosphinyl-substituted acrylonitrle is employed in an amount sufficient to provide from 0.6% to about 12% by weight phosphorus, based on the total composition.

4. The flame retardant composition of claim 1 further comprising at least one additive selected from the group chlorinated polyethylene, polyvinyl chloride, antimony oxide, and the zinc, magnesium, and barium salts of boric acid.

* * * * *